United States Patent [19]
Morrison et al.

[11] 3,793,065
[45] *Feb. 19, 1974

[54] SIZE COATED GLASS FIBERS

[75] Inventors: Albert R. Morrison, Newark; Harold L. Haynes, Granville, both of Ohio

[73] Assignee: Owens-Corning Fiberglas Corporation, Toledo, Ohio

[ * ] Notice: The portion of the term of this patent subsequent to May 23, 1989, has been disclaimed.

[22] Filed: Mar. 10, 1972

[21] Appl. No.: 233,726

[52] U.S. Cl............. 117/126 GQ, 65/3, 106/212, 106/213, 260/233.5
[51] Int. Cl... B32b 17/02, C03c 25/02, C08b 25/02
[58] Field of Search .... 65/3; 117/126 GQ; 106/211, 106/212, 213; 260/233.5

[56] References Cited
UNITED STATES PATENTS

| | | | |
|---|---|---|---|
| 3,664,855 | 5/1972 | Morrison et al. | 106/212 |
| 3,481,771 | 12/1969 | Doering | 117/126 GQ |
| 3,472,682 | 10/1969 | Rommel et al. | 117/126 GQ |
| 3,461,090 | 8/1969 | Haynes et al. | 106/212 X |
| 3,615,311 | 10/1971 | Ignatius | 65/3 |
| 3,513,156 | 5/1970 | Speakman | 260/233.5 |
| 3,720,662 | 3/1973 | Tessler | 260/233.5 |
| 3,462,283 | 8/1969 | Hjermstad | 106/213 |
| 2,946,705 | 7/1960 | Olsen | 117/126 GQ |

OTHER PUBLICATIONS

J. W. Mullen, "Possible Industrial Utilization of Starch Esters" in Ind. Eng. Chem. Vol. 35, p. 381–384 (1943).

*Primary Examiner*—William D. Martin
*Assistant Examiner*—William H. Schmidt
*Attorney, Agent, or Firm*—Carl G. Staelin; John W. Overman; W. Preston Hickey

[57] ABSTRACT

A size for lubricating fibers, including glass fibers, which is a water dispersion of a solid unctuous material, as for example a solid wax, fat, or gelled or otherwise solidified oil, and a starch ester of a cyclic hydrocarbon, as for example a starch ester of an aryl compound, an aralkyl compound, an alkaryl compound, a cycloalkyl compound and a cycloalkenyl compound, or homologues thereof. The wax may be an animal, vegetable, mineral, or synthetic wax which is unctuous and insoluble in water. The oils can be gelled by adding any gelling agent, and preferably a thixotropic gelling agent to the oil. The starch esters are only partially cooked so that unburst starch granules are retained, and this dispersion is intimately mixed with the unctuous solid emulsified particles. Other ingredients such as cationic lubricants, coloring matter, bactericides, waxes having particular characteristics, etc. can be added to provide their separate functions. The combination of the above defined partially burst starch granules of esterified starch, and the emulsified particles of the solid unctuous material have very low migration from coated glass fibers, and when dried, provide low tensions when pulled over guide surfaces.

18 Claims, No Drawings

SIZE COATED GLASS FIBERS

CROSS REFERENCES TO RELATED APPLICATIONS

The present application is a companion application to the copending application Ser. No. 885,599, filed Dec. 16, 1969, now U.S. Pat. No. 3,664,855.

BACKGROUND OF THE INVENTION

The above identified application demonstrates a marked improvement over the prior art in size formulations for glass fibers using a combination of particular starch ethers and emulsified solid unctuous material.

The principle object of the present invention is the provision of other materials for achieving the same general improvement over the prior art, which materials have still further advantages, as for example, greater ease of synthesis.

Further objects and advantages will become apparent to those skilled in the art from the following description of numerous preferred embodiments, and methods of preparing same.

DESCRIPTION OF THE PREFERRED EMBODIMENTS

It has been discovered, that a unique coaction between starch esters of 5 and 6 membered organo ring compounds and substituted 5 and 6 membered organo ring compounds is achieved with emulsified particles of a solid unctuous material such as a wax, a fat, or a gelled oil. It appears that cyclic hydrocarbon esters sufficiently modify the nature of starch as to change it from an "oleophobic" one to a slightly "oleophilic" one to make it compatible with and have an affinity for solid predominately hydrocarbon unctuous materials. The cyclic compounds can be attached to the starch through one or more ester linkages. The esterification of the starch can be produced by reaction with acid anhydrides or acid halides. It appears that the smearing nature of the solid unctuous materials is modified by the semipowdery, dry starch material to provide low tensions when pulled over guide surfaces. On the other hand, the solid particles of unctuous material appear to break up the continuity of the starch coating. The solid nonflowing emulsified particles can be deformed by the starch material on opposite sides thereof when the fibers are flexed without the solid unctuous material flowing to the surface to coat the guide surfaces and thereby cause high tensions. Further, the emulsified particles of solid unctuous material appears to be drawn to and retained about the surface of swollen but unburst starch granules that have had the hydrogen of OH groups of the starch replaced with an ester radical containing a cyclic organo group or radical.

EXAMPLE 1

Esterified starch is produced in a nonaqueous media by the following procedure: Pearl corn starch granules (1,000 g) are added with stirring to 1,340 millileters of pyridine and the slurry is kept at room temperature for 1 hour. The reaction temperature is increased to 50°C as Phenylacetyl chloride equal to 8 percent of the starch solids is added in increments. The reaction mixture is kept at 50°C for 4 hours after the completion of the phenylacetyl chloride addition. The mixture is cooled and filtered. The product is washed with appropriate amounts of a 1 percent solution of hydrochloric acid and water.

The dried product is used in preparing an aqueous forming size of the following ingredients:

| | Size | Solids |
|---|---|---|
| Phenyl acetyl starch ester (as produced above) | 3.0 % | 52.7% |
| Paraffin Wax (130°F melting point) | 2.0 % | 35.0% |
| Polyoxyethylene sorbitan monostearate (emulsifier) | 0.154% | 2.7% |
| Sorbitan monostearate (emulsifier) | 0.146% | 2.6% |
| Cationic lubricant (reaction: product of tetraethylene pentamine and stearic acid in a molar ratio of 1:2.0) | 0.200% | 3.5% |
| Montan wax (167–175°F congealing point) (50% emulsion) | 0.200% | 3.5% |
| Water | Balance | — |

The paraffin wax is melted and brought to a temperature of 180° to 190°F, the cationic lubricant and emulsifying agents are added thereto, and these materials are thoroughly mixed. Boiling water is then added with violent agitation to form an emulsion. Water is added slowly until the inversion is reached, and an additional amount of water is then added.

The starch is partially cooked in a separate pressure kettle at a 6 percent concentration, by raising the temperature at 3°F per minute until a temperature of 180°F is reached. This takes approximately 90 minutes, following which the starch is quenched to a temperature of 150°F. The hot wax emulsion is then added to the cooked starch and the Montan wax emulsion is added. The remainder of the water is added at 150°F, and the ingredients are thoroughly mixed to complete the size preparation. The starch when thus cooked has 30 percent of the original starch granules remaining at least partially unburst.

The size prepared as above described is supplied to a roll type applicator over which 408 filaments from a forming bushing are pulled to coat the filaments. The filaments have a diameter of approximately 0.0003 inch and are of E glass. The coated filaments are drawn together into a strand, and are coiled into a package that is then dried at room temperature for 24 hours. The package has a migration index of 1.20. The dried strand when uncoiled from the package and twisted into a twisted strand in conventional machinery has a fuzz index of 1.0, the best possible rating. The twisted strand when wound into a quill has a low tension with few broken filaments. The same coated, twisted strand when beamed gives very light beaming fuzz, and the beams when woven into fabric using the quilled strand, produces only very light powdering. The fabric when heat cleaned has a burn-off rating of 1 which is the highest possible rating, and exhibits no detectable carbon deposit.

The following examples show that substantially any type of unctuous non-water soluble wax can be used.

EXAMPLE 2

The process of Example 1 is repeated excepting that a refined paraffin wax having a melting point of 96°F is used in place of the paraffin wax having a melting point of 130°F. In this instance, the wax emulsion is prepared at 150°F and the properties of the coated strand equal those of the material of Example 1 in every respect.

EXAMPLE 3

The process of Example 1 is repeated excepting that the wax emulsion used is that of microcrystalline waxes having a melting point of 205°F and the emulsion of which is prepared using boiling water. The strand coated with this material has all of the beneficial properties of that of the material of Example 1, and in addition, has slightly better beaming qualities.

EXAMPLE 4

The process of Example 1 is repeated excepting that the wax emulsion used is a hydrogenated sperm oil wax. This material, likewise, gives coated strand of the same general characteristics as that of Example 1.

Vegetable waxes such as Carnauba, Japan, bayberry, candelilla, and other animal waxes such as bees wax, Chinese wax, etc., can be used. Other mineral waxes such as ozocerite, montan, ceresin, etc. can likewise be used. Some advantages are had in using a combination of ester type wax and paraffin or synthetic waxes such as improved drying characteristics. Synthetic waxes such as polyethylenes, polyethylene glycols, and polyoxyethylene esters, chloronaphthalenes, sorbitols, chlorotrifluoroethylene waxes can be used.

EXAMPLE 5

The process of Example 1 is repeated excepting that propylene glycol alginate is substituted for the combination of emulsifiers used in Example 1. The coated strand has substantially the same properties as does the coated strand of Example 1.

EXAMPLE 6

Esterification of the starch is implemented using the same procedures given in Example 1 excepting that 9 percent by weight of th acid chloride of 4-phenylbutanoic acid based on the starch solids is used in place of the phenyl acetyl chloride. The phenyl butanoic starch ester is then substituted for the starch of Example 1 to produce a forming size. This forming size is applied to glass fibers in the same manner as described in Example 1. The sized fibers have the same improved combination of properties as does the product of Example 1.

EXAMPLE 7

The process of producing starch esters of Example 1 is repeated excepting that 7 percent by weight of cinnamoyl chloride based on starch solids is substituted for the phenyl acetyl chloride and the material is reacted for 6 hours at 38°C. Cinnamoyl chloride has the formula

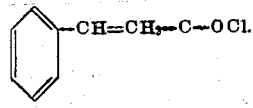

A forming size is made of the esterified product in the same manner as given in Example 1, and this forming size when applied to glass fibers provides fibers having the same combination of improved properties as does the material of Example 1.

Substituted 5 and 6 membered ring compounds bearing aliphatic or acyclic substituents, particularly hydrocarbon side chains, can be used and will produce the same general results.

EXAMPLE 8

The process of Example 1 is repeated excepting that a material having the following formula is substituted for the phenyl acetyl chloride:

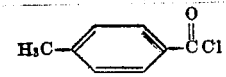

The esterified starch so prepared is then used to make a size using the same procedure given in Example 1. Fibers coated therewith have the same combination of improved properties as do the fibers of example 1.

EXAMPLE 9

The process of Example 1 is repeated excepting that p-(3-methylbutoxy) benzoyl chloride is substituted for the material used in Example 8.

The esterified starch so formed is then used to make a size using the same procedure given in Example 1, and the fibers so formed have the same improved combination of properties as do the fibers of Example 1.

EXAMPLE 10

The procedure of Example 1 is repeated excepting that a material having the following formula is substituted for the phenyl acetyl chloride:

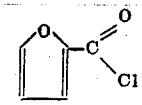

The starch so prepared is then used to make a size using the same procedure given in Example 1, and the fibers so formed have the same combination of improved properties as do the fibers of Example 1.

EXAMPLE 11

The process of Example 1 is repeated excepting that phenyl acetyl bromide is substituted for phenyl acetyl chloride. The starch so prepared is then used to make a size using the same procedure given in Example 1, and the fibers so formed have the same combination of improved properties as do the fibers of Example 1.

The ring and/or substituted groups can include other functional groups, so long as they do not destroy the affinity of the ester for the unctuous materials.

EXAMPLE 12

The process of Example 1 is repeated excepting that a material having the following formula is substituted for the chloride:

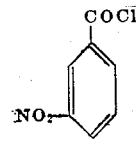

The starch so prepared is then used to make a size using the same procedure given in Example 1, and the fibers coated therewith have the same combination of improved properties as do the fibers of Example 1.

EXAMPLE 13

The process of Example 1 is repeated excepting that cyclohexylacetyl chloride is substituted for the phenyl acetyl chloride.

The starch so prepared is then used to make a size using the same procedure given in Example 1, and the fibers coated therewith have the same combination of improved properties as do the fibers of Example 1.

EXAMPLE 14

The process of Example 1 is repeated excepting that cyclopentylacetyl chloride is substituted for the phenyl acetyl chloride.

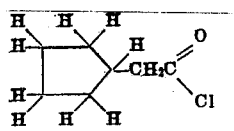

The starch so prepared is then used to make a size using the same procedure given in Example 1, and the fibers coated therewith have the same combination of improved properties as do the fibers of Example 1.

EXAMPLE 15

The process of Example 1 is repeated excepting that 1-cyclohexene-1-carbonyl chloride is substituted for the phenyl acetyl chloride of Example 1.

The starch so prepared is then used to make a size using the same procedure given in Example 1, and the fibers coated therewith have the same combination of improved properties as do the fibers of Example 1.

EXAMPLE 16

Pyridine (40 grams) and 60 grams of phenyl acetic anhydride were dissolved in 2,000 millileters of N,N, dimethylformamide. Pearl corn starch granules (1,000 grams) are slurried into the solution, and the reaction temperature is increased over a 2 hour period to 50°C and kept at this temperature for an additional 4 hours. The reaction mixture is cooled to 25°C and filtered. The starch is washed with distilled water, then with dilute hydrochloric acid, is filtered, is washed again with water, and is air dried for two days. An aqueous forming size prepared from the starch ester and applied to glass fibers at forming according to the procedure given in Example 1 produces fibers having the same general properties as those of Example 1.

EXAMPLES 17–19

Aqueous forming sizes were made using the percentages by weight of the following materials:

The benzoylated starch was prepared by substituted benzoyl chloride for the phenyl acetyl chloride of Example 1 in an amount such that the benzoylated starch has benzoyl ester groups substituted for more than 2 percent of the OH groups of the starch. The size is prepared by blending the starch materials in approximately one half of the total water. This mixture is heated to 180°F and let stand for one half hour, following which cold water in approximately 1/10 of the total quantity is added to quench the starch. When so cooked, only approximately 10 percent or less of the starch granules are burst. The cooking is preferably carried out to produce maximum swelling of the starch granules and has a milky color.

An emulsion of the wax is prepared by heating the wax to a temperature of approximately 180°F. The emulsifying agents are stirred into the molten wax, and thereafter boiling water is slowly poured into the wax mixture with violent agitation to form an emulsion. Water is added slowly until the inversion is reached, and thereafter an additional amount of water is added to provide a stable emulsion. The starch mixture is cooled to a temperature of approximately 150°F and the wax emulsion is then added thereto. The size is then applied to glass fibers at forming as given in Example 1 above. The fibers so produced have substantially the same improved properties as that given in Example 1.

EXAMPLE 20

This example demonstrates that oil thickened to a nonrunny or solid state produces the same general results as does wax. The procedure given in Example 17 was repeated excepting that the vegetable wax emulsion was replaced with 2 percent of a hydrogenated vegetable oil that was thickened with 5 percent of Thixin R based on the oil. Thixin R is a trademark for an organic thixotrope sold by the Baker Castor Oil Company, and is a high melting (Ca 85°C) ester of castor oil. When cooled to room temperature, the vegetable oil and Thixin R mixture forms a self-supporting gel so that the emulsified particles of the mixture are solid and do not flow at room temperature. The glass fibers produced using this size mixture have substantially the same properties as do the fibers produced as given in Example 17 above.

Other suitable gelling agents which can be used are: Attapulgite ($3MgO \cdot 1.5 Al_2O_3 \cdot 8 SiO_2 \cdot 9 H_2O$), Baymal Alumina, a water soluble copolymer of methyl vinyl ether and maleic anhydride, polysaccharide gum (Kelzan made by the Kelco Company), Carbopol (a polycarboxylic acid thixotropic agent manufactured by the

| Materials | Example 17 | | Example 18 | | Example 19 | |
|---|---|---|---|---|---|---|
| | Size | Solids | Size | Solids | Size | Solids |
| Pearl starch | 3.0% | 55.0% | — | — | 1.0% | 38.5% |
| Starch esterified with benzoyl chloride | 1.0 | 18.4 | 6.0 | 55.0 | 1.0 | 38.5 |
| Vegetable wax (Sywax 115) | 0.75 | 14.0 | — | — | — | — |
| Paraffin wax | 0.25 | 4.6 | 4.0 | 35.4 | 0.5 | 19.2 |
| Emulsifying agent (Polyoxyethylene Sorbitan monostearate) | 0.14 | 2.6 | 0.2 | 1.9 | 0.025 | .95 |
| Emulsifying agent (Sorbitan monostearate) | 0.12 | 2.2 | 0.2 | 1.9 | 0.025 | 0.95 |
| Cationic lubricant | 0.175 | 3.2 | 0.3 | 2.8 | 0.05 | 1.9 |

B.F. Goodrich Chemical Company per U.S. Pat. No. 2,798,053), a microcrystaline cellulose, Bentonite Clay (Benagua), Guar gum, Methocel (a cellulose gum of: methyl cellulose, hydroxypropyl-methylcellulose, and hydroxybutylmethylcellulose), and still others as will occur to those skilled in the art.

In general, aqueous sizes for glass fibers will have the following range of compositions:

| | |
|---|---|
| Starch ester | 0.5-4 |
| Starch diluent | 0-4 |
| Solid unctuous material (wax, fats, gelled oils) | 0.3-5 |
| Secondary film former | 0-2 |
| Nonionic oil | 0-0.75 |
| Cationic lubricant | 0.05-2.0 |
| Emulsifying agent | 0.05-1.0 |

As previously stated, the starch esters are esters of cyclic hydrocarbons wherein a sizable percentage of the OH groups of the starch (2 percent or more) are esterified to give a material of the following general formula:

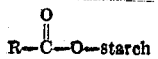

$$R-\overset{O}{\underset{\|}{C}}-O-\text{starch}$$

wherein: R is from the group of 5 and 6 membered ring compounds and substituted ring compounds a major portion of which is hydrocarbon, and with the substitution preferably containing not more than approximately 20 carbon atoms. The substituted groups may contain non hydrocarbon groups such as amine groups, nitrogen, nitro groups, ketone groups, aldehyde groups, other ester groups, nitrite groups, etc.

The starch diluent can be substantially any other starch film former. The starch diluent may be used to cheapen the product, and such diluents can be used, for example, as a pearl starch, rice starch, any underivatized starch, and/or derivatized starch.

The solid unctuous material can be any wax, fat or gelled oil which does not flow at the temperatures at which the coated strand will be used. According to the invention, and as stated previously, it has been found that the solid unctuous materials do not seep to the surface of the guide eyes over which the strand is drawn, and therefore, do not produce high running tensions as does occur when oils are used.

The secondary film former can be any soft film former commonly used in the art, as for example, gelatine, polyvinyl alcohol, Polyox, acrylates, colloidal animal protein, Renten, etc. Reten is a cationic polymer prepared from 2.5 percent to 10 percent of cationic monomer, and 90 to 97.5 percent of a nonionic monomer. The cationic monomer is a quaternary prepared from diaminoethyl methacrylate and dimethyl sulfate. The nonionic is acrylamide.

The nonionic oils can be vegetable, animal, or mineral oils, and are preferably hydrogenated to reduce their flowability. These materials are used in general to give abrasion resistance to the coated fibers when dry.

The cationic lubricants may be any of the cationic lubricants as is used in the art to serve principally as a lubricant prior to the time that the coated fibers are dried.

The emulsifying agent for the wax can be any suitable emulsifying agent, preferably a nonionic having a HLB between approximately 3 to 16, and the polyoxyalkylenesorbitans are preferred.

In general, the amount of solids in the aqueous sizes that are applied to the glass fibers can be varied from approximately 2 percent to approximately 12 percent, depending upon the amount of material which it is desired to coat the fibers with, and also to some degree, the type of materials which are used. In general, the solids content of the sizes will have the following percentages by weight:

| | |
|---|---|
| Starch ester | 5-80% |
| Starch diluent | 0-70% |
| Solid unctuous material | 5-40% |
| Secondary film formers | 0-20% |
| Nonionic oils | 0-5% |
| Cationic lubricants | 0-5% |
| Emulsifying agents | 0.5-10% |

Good materials can be made using the following materials in percent by weight of solids: from 10-55 percent pearl starch; 5-75 percent starch ester; and 10-40 percent of unctuous material. Sizes therefrom may contain from 3.5 to 7 percent solids. These sizes will have the following materials in percent by weight: pearl starch 1 to 4 percent; starch esters 0.5 to 4.5 percent; and wax 0.8 to 2 percent.

The dried residue that is formed on the fibers will have substantially the same composition as the percent solids by weight given above, excepting that the cationic lubricants and to a lesser extent the nonionic oil, may be lower due to migration.

The coating that is left on the fibers will, comprise unburst starch granules coated with small emulsified particles of the solid unctuous material, and any nonionic oils present. These coated granules will be cemented together loosely by the starch material from the granules which have been burst, as well as any secondary film formers present. The starch material from the burst granules will hereafter be called solubilized starch, and the solubilized starch when dried around the coated granules produces a powdery surface thereon that is also attracted to the starch esters to prevent the solid unctuous material from smearing onto the guide surfaces. The solubilized starch and secondary film former are, in a sense, a soft cementing material which surrounds and holds the unburst starch granules coated with the emulsified particles of solid unctuous material together, so that when the coated fibers are bent, the soft nonrunny unctuous material is deformed to take up the foreshortening which occurs by reason of the flexing action. The soft cementing material (solubilized starch and secondary film former) is thereby prevented from being flaked off of the surface of the glass fibers. Any emulsified nonionic oil particles present can, of course, seep to the surface to increase the tension, as desired, and to the extent that the nonionic oil is present. The cationic lubricant is, of course, water soluble and is attracted to glass and metal surfaces, so that the cationic lubricant insures a lubricating effect even though the water should be displaced by pressure over the guide surfaces.

Although a cooperation of the starch esters of the invention with the wax particles is had when the starch ester granules are burst or dispersed, the preferred materials of the invention will preferably have at least 20 percent of the starch granules swollen but unburst. The best materials have 50 percent or more of the starch present in the form of unburst starch granules, with the most preferred materials having approximately 75 percent or more of the starch granules in the unburst condition.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. In the process of producing glass fibers comprising: pulling molten streams of glass at a high rate of speed to attenuate the streams, cooling the streams to form solid fibers, coating the fibers with an aqueous dispersion of glass fiber lubricants, coiling the fibers into a package, and drying the package, the improvement wherein the glass fiber lubricants are caused to contain an unctuous material from the group consisting of vegetable waxes, animal waxes, mineral waxes, synthetic waxes, fats and gelled oils; and an effective amount of swollen but unburst starch granules to prevent migration of the unctuous material during drying, said granules being modified by ester linkages having a radical from the group consisting of five and six membered ring compounds and five and six membered substituted ring compounds a major portion of which is hydrocarbon.

2. The process of claim 1 wherein said ring compound is substituted by not more than approximately 20 carbon atoms.

3. The process of claim 1 wherein said ring compound contains a benzene ring.

4. The process of claim 1 wherein said starch granules are modified by benzoate ester groups.

5. The process of claim 1 wherein said granules are modified by phenyl acetate ester groups.

6. In the process of coating glass fibers with an aqueous dispersion of glass lubricants, wrapping the fibers into a coiled package, and drying the package, the improvement wherein the aqueous dispersion is caused to contain emulsified particles of an unctuous material from the group consisting of oils, fats and waxes, and an effective amount of swollen but unburst starch granules containing ester groups having the following formula to reduce migration of the unctuous material:

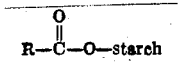

wherein: R is from the group of five and six membered ring compounds and substituted ring compounds a major portion of which is hydrocarbon.

7. The process of claim 6 wherein said R group is a ring compound containing not more than 20 carbon atoms substituted thereon.

8. The process of claim 6 wherein said R group contains a benzene ring.

9. The process of claim 6 wherein said R group is a benzene ring.

10. The process of claim 6 wherein said ester is a phenyl acetate starch ester.

11. Glass fibers having an aqueous coating thereon consisting essentially of solubilized starch; unctuous material from the group consisting of vegetable waxes, animal waxes, mineral waxes, synthetic waxes, fats and gelled oils; and an effective amount of swollen but unburst starch granules esterified with materials from the group consisting of five and six membered ring compounds and five and six membered substituted ring compounds a major portion of which is hydrocarbon to prevent migration of the unctuous material during drying.

12. The glass fibers of claim 11 wherein said ring compound is not substituted by more than approximately 20 carbon atoms.

13. The glass fibers of claim 11 wherein said ring compound contains a phenyl group.

14. The glass fibers of claim 11 wherein said ester is a benzoylated starch.

15. The glass fibers of claim 11 wherein said ester is a phenyl acetate ester.

16. The glass fibers of claim 1 wherein the ring compound contains non hydrocarbon substitution from the group consisting of amine groups, nitrogen, nitro groups, ketone groups, aldehyde groups, and nitrite groups.

17. Glass fibers having an effective amount of swollen and unburst starch granules thereon that are modified by ester groups having the formula:

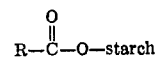

wherein R is from the group of five and six membered ring compounds and substituted ring compounds a major portion of which is hydrocarbon, said starch granules having emulsified particles of wax grouped around said granules.

18. Glass fibers having a coating thereon consisting essentially of the following solids in percent by weight:

| Esterified starch granules having ester groups of the formula 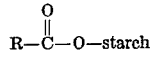 wherein R is from the group of five and six membered ring compounds and substituted ring compounds a major portion of which is hydrocarbon an effective amount of swollen and unburst | Percent 5–80 |
|---|---|
| Starch diluent | 0–70 |
| Solid unctuous material | 5–40 |
| Secondary film formers | 0–20 |
| Nonionic oils | 0–5 |
| Cationic lubricants | 0–5 |
| Emulsifying agents | 0.5–10 |

* * * * *